(12) United States Patent
Jung et al.

(10) Patent No.: US 10,257,779 B2
(45) Date of Patent: Apr. 9, 2019

(54) METHOD AND APPARATUS FOR SEARCHING FOR ACCESS POINT IN WIRELESS COMMUNICATION SYSTEM

(71) Applicant: Samsung Electronics Co., Ltd., Suwon-si (KR)

(72) Inventors: Hakyung Jung, Seoul (KR); Jungshin Park, Seoul (KR); Yeongmoon Son, Yongin-si (KR); Jinsung Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 33 days.

(21) Appl. No.: 14/914,427

(22) PCT Filed: Sep. 1, 2014

(86) PCT No.: PCT/KR2014/008154
§ 371 (c)(1),
(2) Date: Feb. 25, 2016

(87) PCT Pub. No.: WO2015/030558
PCT Pub. Date: Mar. 5, 2015

(65) Prior Publication Data
US 2016/0212697 A1    Jul. 21, 2016

(30) Foreign Application Priority Data
Aug. 30, 2013 (KR) .................. 10-2013-0104159

(51) Int. Cl.
*H04W 48/20* (2009.01)
*H04W 48/16* (2009.01)
(Continued)

(52) U.S. Cl.
CPC ........... *H04W 48/20* (2013.01); *H04W 48/14* (2013.01); *H04W 48/16* (2013.01); *H04W 4/18* (2013.01);
(Continued)

(58) Field of Classification Search
CPC ..... H04W 48/20; H04W 48/14; H04W 48/16; H04W 4/18; H04W 48/12; H04W 84/14; H04W 84/12
See application file for complete search history.

(56) References Cited

U.S. PATENT DOCUMENTS 8,638,702 B2 *   1/2014   Daum ................... H04W 48/16
                                                               370/311
8,923,257 B2 *  12/2014   Montemurro ......... H04W 48/16
                                                               370/338
(Continued)

FOREIGN PATENT DOCUMENTS

EP              2355585 A1    8/2011
KR        10-2011-0088761       8/2011
(Continued)

OTHER PUBLICATIONS

Communication dated Dec. 20, 2016 with Supplementary European Search Report corresponding to European Application No. EP 14841298.4.
(Continued)

*Primary Examiner* — Brian T O Connor
(74) *Attorney, Agent, or Firm* — The Farrell Law Firm, P.C.

(57) ABSTRACT

The present invention relates to a method and an apparatus for searching for an access point of a terminal in a wireless communication system, and the method for searching for an access point of a terminal in a wireless communication system according to the present invention comprises the steps of: transmitting a probe request frame including an identifier for searching for a specific access point; receiving a probe response frame transmitted from the access point related to the identifier; and connecting to the access point having transmitted the probe response frame.

18 Claims, 9 Drawing Sheets

(51) Int. Cl.
*H04W 48/14* (2009.01)
*H04W 4/18* (2009.01)
*H04W 84/14* (2009.01)
*H04W 48/12* (2009.01)
*H04W 84/12* (2009.01)

(52) U.S. Cl.
CPC ............ *H04W 48/12* (2013.01); *H04W 84/12* (2013.01); *H04W 84/14* (2013.01)

(56) References Cited

U.S. PATENT DOCUMENTS

| | | | | |
|---|---|---|---|---|
| 9,030,985 | B2* | 5/2015 | Kholaif | H04W 12/04 370/311 |
| 9,042,324 | B2* | 5/2015 | Zhang | H04W 72/04 370/329 |
| 9,155,030 | B2* | 10/2015 | Chhabra | H04W 48/16 |
| 9,271,226 | B2* | 2/2016 | Montemurro | H04W 48/16 |
| 9,510,274 | B2* | 11/2016 | Jeong | H04W 48/16 |
| 9,572,092 | B2* | 2/2017 | Park | H04W 48/16 |
| 9,622,156 | B2* | 4/2017 | Calcev | H04W 48/16 |
| 9,814,085 | B2* | 11/2017 | Cherian | H04W 76/021 |
| 9,843,986 | B2* | 12/2017 | Poitau | H04W 40/246 |
| 9,913,178 | B2* | 3/2018 | Lee | H04W 36/0066 |
| 2011/0040969 | A1 | 2/2011 | Yao et al. | |
| 2011/0188657 | A1 | 8/2011 | Kweon et al. | |
| 2012/0076117 | A1* | 3/2012 | Montemurro | H04W 48/16 370/338 |
| 2013/0065633 | A1 | 3/2013 | Sridhara et al. | |
| 2013/0088983 | A1 | 4/2013 | Pragada et al. | |
| 2013/0121325 | A1* | 5/2013 | McCann | H04W 48/12 370/338 |
| 2013/0176897 | A1 | 7/2013 | Wang et al. | |
| 2013/0188628 | A1 | 7/2013 | Lee et al. | |
| 2013/0208891 | A1* | 8/2013 | Kholaif | H04W 12/04 380/270 |
| 2013/0272289 | A1* | 10/2013 | Yao | H04W 48/16 370/338 |
| 2014/0171078 | A1* | 6/2014 | Ryerson | H04W 48/18 455/435.2 |
| 2014/0199968 | A1* | 7/2014 | Canpolat | H04W 48/16 455/411 |
| 2014/0254454 | A1* | 9/2014 | Calcev | H04W 48/20 370/312 |
| 2015/0078358 | A1* | 3/2015 | Park | H04W 48/14 370/338 |
| 2015/0156710 | A1* | 6/2015 | Montemurro | H04W 48/16 370/329 |
| 2015/0319563 | A1* | 11/2015 | Johnson | H04W 4/02 455/456.3 |
| 2015/0319686 | A1* | 11/2015 | Hedberg | H04W 48/20 370/329 |
| 2015/0351026 | A1* | 12/2015 | Lee | H04W 40/244 370/237 |
| 2016/0165528 | A1* | 6/2016 | Montemurro | H04W 48/16 370/338 |

FOREIGN PATENT DOCUMENTS

| | | |
|---|---|---|
| KR | 10-2012-0032298 | 4/2012 |
| KR | 10-2012-0089807 | 8/2012 |

OTHER PUBLICATIONS

International Search Report for PCT/KR2014/008154 dated Nov. 19, 2014.

* cited by examiner

FIG. 8

| Order | Information | Notes |
|---|---|---|
| 1 | SSID | |
| 2 | Supported rates | |
| ... | ... | |
| Last-3 | 3GPP Cellular Network | The 3GPP Cellular Network ANQP-element contains cellular information such as network advertisement information e.g., network codes and country codes to assist a 3GPP non-AP STA in selecting an AP to access 3GPP networks. |
| Last-2 | NAI Realm | The NAI Realm ANQP-element provides a list of network access identifier (NAI) realms corresponding to SSPs or other entities whose networks or services are accessible via this AP |
| Last-1 | Roaming Consortium | The Roaming Consortium ANQP-element provides a list of information about the Roaming Consortium and/or SSPs whose networks are accessible via this AP |
| Last | Vendor Specific | |

FIG. 9

| Order | Information | Notes |
|---|---|---|
| 1 | SSID | |
| 2 | Supported rates | |
| ... | ... | |
| Last-3 | 3GPP Cellular Network | The 3GPP Cellular Network ANQP-element contains cellular information such as network advertisement information e.g., network codes and country codes to assist a 3GPP non-AP STA in selecting an AP to access 3GPP networks. |
| Last-2 | NAI Realm | The NAI Realm ANQP-element provides a list of network access identifier (NAI) realms corresponding to SSPs or other entities whose networks or services are accessible via this AP |
| Last-1 | Roaming Consortium | The Roaming Consortium ANQP-element provides a list of information about the Roaming Consortium and/or SSPs whose networks are accessible via this AP |
| Last | Vendor Specific | |

METHOD AND APPARATUS FOR SEARCHING FOR ACCESS POINT IN WIRELESS COMMUNICATION SYSTEM

CROSS-REFERENCE TO RELATED APPLICATIONS/INCORPORATION BY REFERENCE

This application is a National Phase Entry of PCT International Application No. PCT/KR2014/008154, filed on Sep. 1, 2014, and claims priority to Korean Patent Application No. 10-2013-0104159, filed on Aug. 30, 2013, the contents of which are incorporated herein by reference in their entirety.

TECHNICAL FIELD

The present invention relates to wireless communication systems, and more particularly relates to a method and apparatus for searching for an access point in a wireless communication system.

BACKGROUND ART

Mobile communication systems have been developed to provide voice call services, supporting users' mobility. With the development of communication technology, they have recently provided data communication services, or high speed data services. As mobile communication systems evolve to provide more various services, they face lack of resources and users' demands for high speed data services. Therefore, development of more advance mobile communication systems is required.

As smartphones were developed, the mobile traffic has rapidly increased and this causes cellular networks to have difficulty in covering the increase speed of traffic. Wireless LANs (WLANs) that can be established with using unlicensed bands in low cost, as an offloading solution, have again attracted the attention of cellular network operators.

Although most cellular network operators provide services to their subscribers via their directly installed WLANs or in such a way that they are associated with other WLAN operators, they have difficulty in processing traffic of the subscribers in a pace where there is a lot of floating population via only they cellular base stations. In this case, the cellular network operators guide the subscribers to receive services via a WLAN access point.

However, cellular service subscribers who want to use a WLAN access point have been facing difficulty from the moment when they start to search for a WLAN access point to be accessed. As an example of the difficulty, while most cellular service subscribers want to search for only a WLAN access point provided by their cellular network operator, Service Set Identifiers (SSIDs) transmitted from a number of access points surrounding the subscribers are listed on the WLAN access management program of their terminal each time the terminal attempts to search for the corresponding WLAN access point.

This deteriorates user convenience and also causes traffic by the access points that a user do not want to access, thereby deteriorating the quality of WLAN service.

DISCLOSURE OF INVENTION

Technical Problem

The present invention has been made to address the above problems and disadvantages, and to provide a method and apparatus for efficiently searching for a wireless LAN (WLAN) access point in a wireless communication system.

Solution to Problem

In accordance with an aspect of the present invention, a method for a terminal to scan an access point (AP) in a wireless communication system is provided. The method includes: transmitting a probe request frame containing an identifier for searching for a specific AP; receiving a probe response frame transmitted from an AP related to the identifier; and attempting to access the AP that transmitted the probe response frame.

In accordance with another aspect of the present invention, a method for an access point (AP) to respond to the AP scan in a wireless communication system is provided. The method includes: receiving a probe request frame from a terminal; identifying an identifier for scanning a specific AP contained in the probe request frame; determining whether the identified identifier corresponds to an identifier related to the AP; and when the identified identifier corresponds to an identifier related to the AP, transmitting a probe response frame in response to the probe request frame to the terminal.

In accordance with another aspect of the present invention, a terminal configured to scan access points (APs) in a wireless communication system is provided. The terminal includes: a wireless local area network (WLAN) communication interface for transmitting a probe request frame or receiving a probe response frame; and a WLAN access management for: transmitting a probe request frame containing an identifier for searching for a specific AP; receiving a probe response frame transmitted from an AP related to the identifier; and performing a control operation to attempt to access the AP that transmitted the probe response frame.

In accordance with another aspect of the present invention, an access point (AP) configured to respond to the AP scan in a wireless communication system is provided. The AP includes: a wireless local area network (WLAN) communication interface for receiving a probe requesting frame from a terminal or transmitting a probe response frame to the terminal; and a controller for: identifying, when receiving the probe request frame from the terminal, an identifier for scanning a specific AP contained in the probe request frame; determining whether the identified identifier corresponds to an identifier related to the AP; and transmitting, when the identified identifier corresponds to an identifier related to the AP, a probe response frame in response to the probe request frame to the terminal.

Advantageous Effects of Invention

As described above, the present invention enables only part, which satisfies a condition, from among the access points to be retrieved to respond to a scan request message from a terminal, thereby reducing the amount of traffic for searching for an access point that occurs in wireless LAN (WLAN) channels.

In this case, since the WLAN is not divided into a control channel used for a search process into a data channel used for the transmission of data, the reduction in search traffic provides more advantages such as more channel resources can be used to transmit data.

BRIEF DESCRIPTION OF DRAWINGS

FIG. 8 is a diagram showing an example of a format of a probe request frame, according to an embodiment of the present invention.

FIG. 9 is a diagram showing an example of a format of a beacon frame or a probe response frame, according to an embodiment of the present invention.

MODE FOR THE INVENTION

Embodiments of the present invention are described in detail referring to the accompanying drawings. The same reference numbers are used throughout the drawings to refer to the same or similar parts. Detailed descriptions of well-known functions and structures incorporated herein may be omitted to avoid obscuring the subject matter of the invention.

The following description provides a method and apparatus for searching for an access point (AP) of a wireless local area network (WLAN). In particular, the following description explains a method and apparatus for reducing traffic related to the search of a WLAN AP in an environment where cellular communication and WLAN communication are cooperating with each other.

Figure 1:
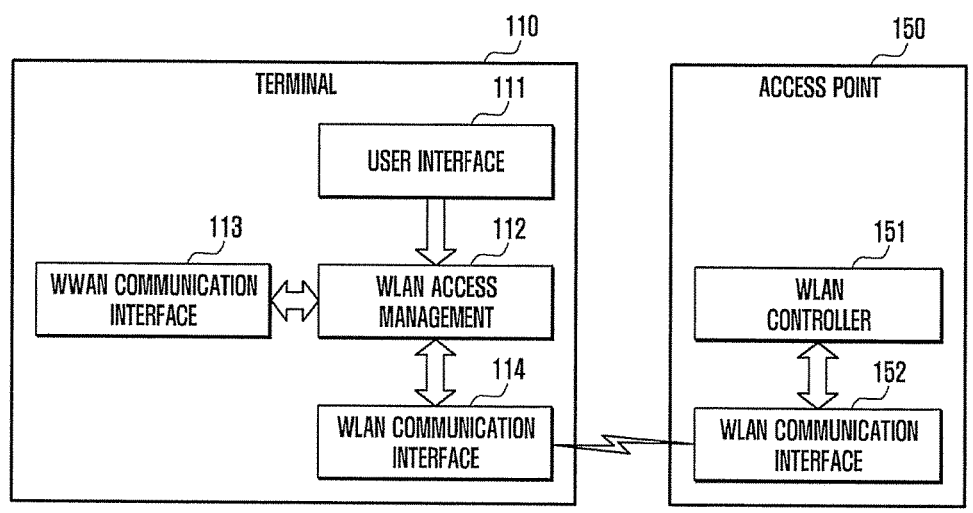
FIG. 1 is a diagram showing primary part of an access point and a terminal according to an embodiment of the present invention.

FIG. 1 is a diagram showing primary part of an access point and a terminal according to an embodiment of the present invention.

Referring to FIG. 1, the terminal 110 and the access point (AP) 150 are capable of communicating with each other via the wireless local area network (WLAN) communication interfaces.

The terminal 110 is capable of including a WLAN communication interface 114, a user interface 111, a WLAN access management 112, and a wireless wide area network (WWAN) communication interface 113.

According to embodiments of the present invention, the user interface 111 is capable of receiving a user's preference or policy (hereafter called a 'policy') as to whether the user wants to preferentially access an AP provided by a mobile network operator. The method for a user to input the policy via the user interface 111 will be described in detail later referring to FIG. 2.

The WLAN access management 112 is capable of receiving a user's policy via the user interface 111 and applies it to management of the WLAN. The WLAN access management 112 is capable of obtaining information regarding WWAN operators based on communication of the WWAN communication interface 113. The information regarding WWAN operators may be Public Land Mobile Network (PLMN) ID, Network Access identifier (NAI), Roaming Consortium ID, etc.

The WLAN access management 112 checks a policy that the user wants to preferentially access to an AP provided by a mobile network operator via the user interface 111. The identifier of a mobile network operator (operator identifier) may be input by the user to the user interface 111 or selected by the user from a list. When a WWAN operator and a WLAN operator are identical to each other, the WLAN access management 112 is capable of identifying an identifier of an operator via the WWAN communication interface 113, directly or without user inputs. The WLAN access management 112 is capable of searching for a specific AP, via WLAN communication interface 114, based on the identified operator identifier.

Although the embodiment uses the operator identifier to search for a specific AP, it should be understood that information for searching for a specific AP is not limited to the operator identifier.

In an embodiment, information for searching for a specific AP may be a location-related identifier, e.g., an identifier capable of indicating one or more APs installed in a particular area. More specifically, information for searching for a specific AP may be an identifier indicating: a type of a particular area, such as a convention center, a coffeehouse, etc.; a civic address; a geospatial location, such as latitude, longitude, altitude, and azimuth; or the like.

The information for searching for a specific AP may include various types of identifiers, such as an identifier indicating a public access point (AP) that does not employ a security system, such as a password, an authentication key, etc.

Although the embodiment is implemented in such a way that the information for searching for a specific AP includes an operator identifier, a location-related identifier, a public AP indicating identifier, etc., it should be understood that the present invention is not limited thereto. It should be understood that the information for searching for a specific AP may also include various types of identifiers.

In various embodiments of the present invention, the user may input information regarding an AP that the user wants to preferentially access via the user interface 111. For example, when a user wants to access an AP of a specific operator, the user may input the operator identifier via the user interface 111.

When a user wants to preferentially search for and to access an AP installed in a particular place where the user is located, e.g., a coffeehouse, etc., the user may input information regarding the place, information regarding the store identifier, geographic information such as latitude/longitude, or the like, via the user interface 111.

Similarly, a user may also input an identifier indicating a public AP via a user interface 111.

As described above, the user inputs a policy that the user wants to preferentially access an AP via the user interface 111. The input policy is transferred to the WLAN access management 112. The WLAN access management 112 checks the policy and performs processes after the checking process.

The WLAN controller 151 of the AP 150 is capable of controlling signals flowing between blocks related to operations of the AP 150. The WLAN controller 151 is capable of receiving/transmitting signals from/to the terminal 110 via the WLAN communication interface 152.

In particular, when the WLAN controller 151 receives a probe request frame from the terminal, it is capable of checking whether the probe request frame contains an operator identifier. The probe request frame contains an operator identifier, and this means that the terminal has requested a response with only an AP corresponding to the operator identifier.

In this case, the WLAN controller 151 is capable of determining whether the operator identifier contained in the probe request frame corresponds to an identifier of an operator associated with the WLAN controller 151. When the WLAN controller 151 ascertains that the operator identifier contained in the probe request frame corresponds to an identifier of an operator associated with the WLAN controller 151, it is capable of performing a control operation to transmit the probe response frame to the terminal in response to the probe request frame. The probe response frame may contain the operator identifier.

On the other hand, when the WLAN controller 151 ascertains that the operator identifier contained in the probe request frame does not correspond to an identifier of an operator associated with the WLAN controller 151, it ignores the probe request frame. Ignoring the probe request frame is used in the sense of dismissing the probe request frame or rejecting the transmission of the probe response frame in response to the probe request frame.

FIGS. 2a to 2c show diagrams user interfaces (UIs) for setting an AP search policy in a terminal according to an embodiment of the present invention.

FIG. 2a shows a UI related to the environment settings of a terminal. In the embodiment, a UI related to the settings of an AP search policy may be located below the Wi-Fi settings of the environment settings UI (or as the related menu).

FIG. 2b shows a UI for Wi-Fi settings. As shown in FIG. 2b, the UI related to the AP search policy settings may be located below the details settings (or as the related menu).

FIG. 2c shows a UI related to the AP search policy settings. The UI is capable of including a function for toggling whether the priority access to an AP provided by an operator is set or released. In an embodiment, in a state where the priority access to an AP provided by an operator has been set in a terminal, when the terminal attempts to preferentially access an AP provide by an operator in an area and detects that the operator AP does not exist in the area, the UI may show information that the terminal proceeds with an access to a general AP.

In addition, as shown in FIG. 2c, the terminal may include a UI allowing the user to input information regarding the operator manually.

Figure 3:
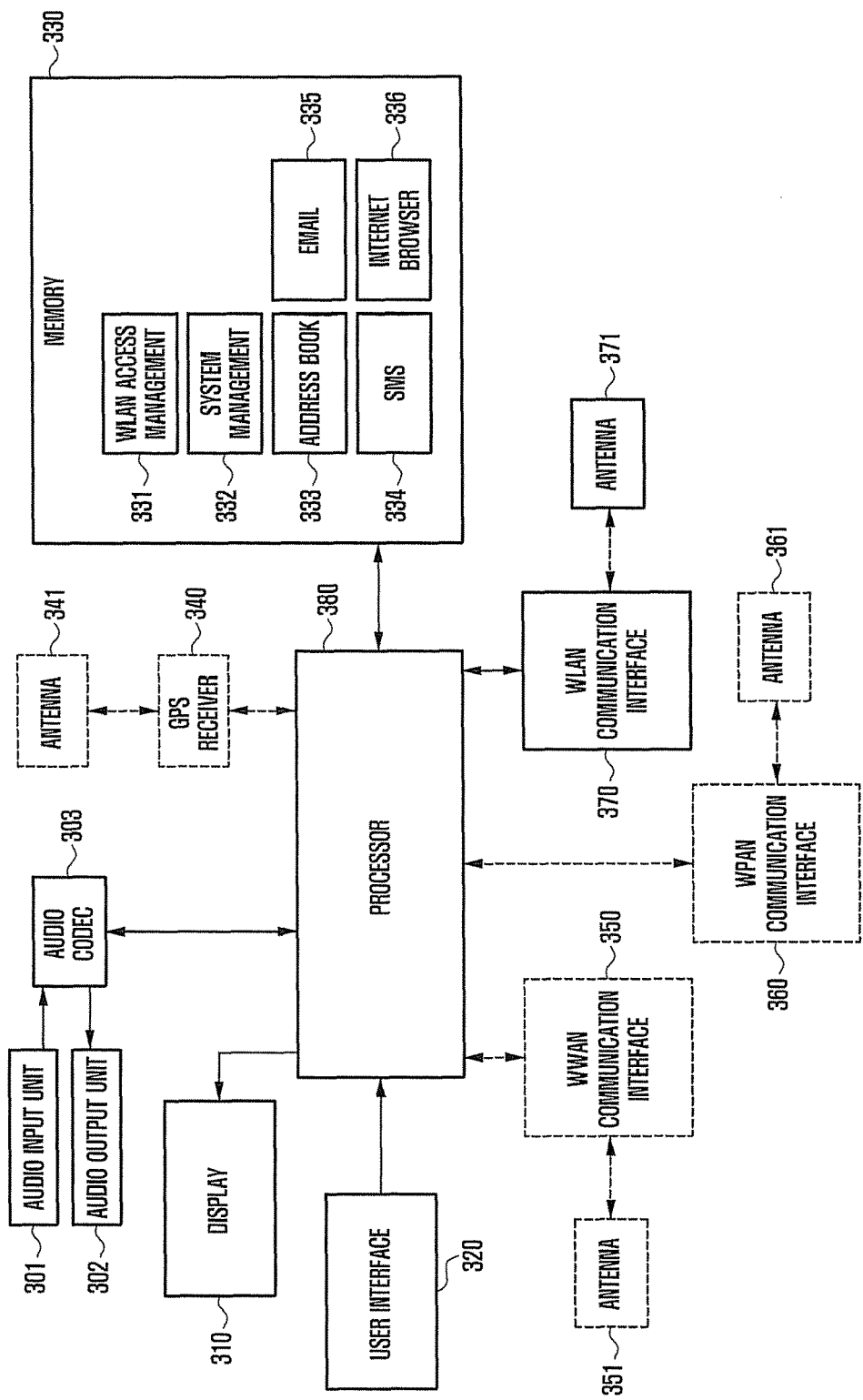
FIG. 3 is a block diagram showing a terminal according to an embodiment of the present invention.

FIG. 3 is a block diagram showing a terminal according to an embodiment of the present invention.

The terminal is capable of including an audio input unit 301, an audio output unit 302 and an audio codec 303, in order to process audio signals. The audio codec 303 may include a data codec for processing packet data, etc. and an audio codec for processing audio signals, such as voice signals, etc. The audio codec 303 converts digital audio signals into analog audio signals and plays back them via the audio output unit 302 (e.g., a speaker). The audio codec 303 also converts analog audio signals, received via the audio input unit 301 (e.g., a microphone), into digital audio signals.

The display 310 may be implemented with a Liquid Crystal Display (LCD), Organic Light Emitting Diodes (OLEDs), Active Matrix Organic Light Emitting Diodes (AMOLEDs), etc. The display 310 is capable of displaying menus, input data, function-setting information, and additional information, which are related to the terminal. The display 310 is capable of displaying a booting screen, an idle screen, a menu screen, a call screen, and application executing screens, which are related to the terminal.

The user interface 320 is capable of receiving key operations for controlling the terminal, input by the user, creating key input signals, and transferring the signals to the processor 380. The user interface 320 may be implemented with a keypad with alphanumeric keys and direction keys. The user interface 320 may be implemented as a function key on one side of the terminal.

The memory 330 is capable of storing data and programs required to operate the terminal according to embodiments of the present invention. More specifically, the memory 330 may store data, related to WLAN access management 331, system management 332, address book 333, Short Message Service (SMS) 334, email 335, and Internet browser 336, in corresponding areas.

The terminal is capable of including communication modules related to corresponding communication. For example, the terminal is capable of including: a Global Positioning System (GPS) receiver and the antenna, related to GPS communication; a WWAN communication interface 350 and the antenna 351, related to WWAN communication; a WPAN communication interface 360 and the antenna 361, related to WPAN communication; and a WLAN communication interface 370 and the antenna 371, related to WLAN communication.

The processor 380 is capable of controlling signals flowing between the blocks configured to enable the terminal to perform operations according to embodiments of the present invention. For example, the processor 380 is capable of controlling the terminal to perform: the transmission of a probe request frame including an identifier used for searching for a specific AP; and the reception of a probe response frame from an AP related to the identifier. The processor 380 is capable of controlling the terminal to access the AP that transmitted the probe response frame.

In an embodiment of the present invention, after transmitting a probe request frame, the processor 380 is capable of running a timer. When the processor 380 has not received a probe response frame in response to the probe request frame before the timer expires, it may control the terminal to transmit a probe request frame for searching for all APs.

In an embodiment of the present invention, the processor 380 may determine whether the terminal receives a probe response frame from an AP related to the identifier, before transmitting the probe request frame for searching for all APs. When the processor 380 ascertains that the terminal receives a probe response frame corresponding to an AP provided by a specific operator before transmitting the probe request frame for searching for all APs, it may control the terminal to access the AP that transmitted the probe response frame.

Figure 4:
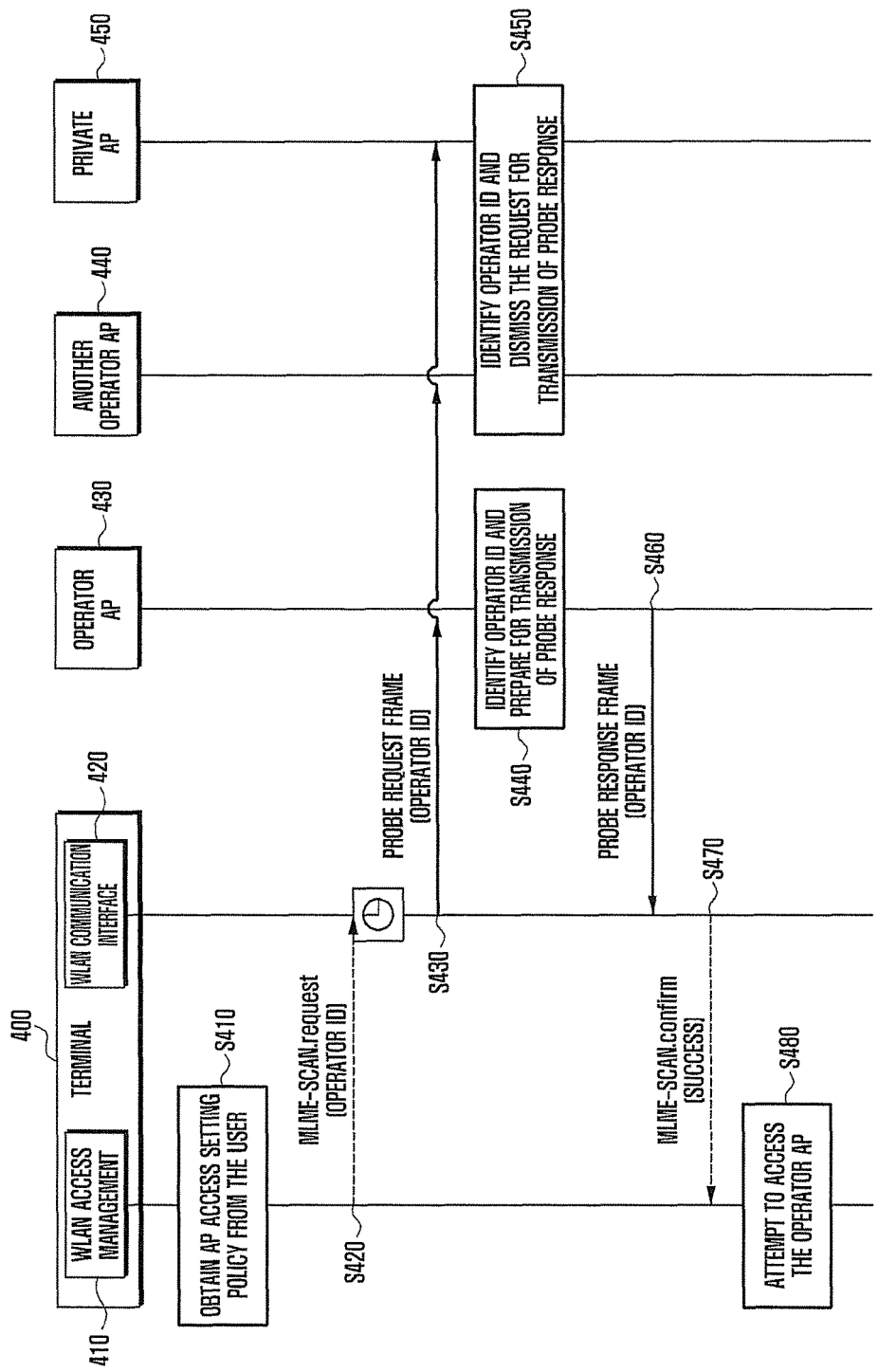
FIG. 4 is a flow diagram showing the flow of messages between a terminal and an access point when an operator AP that the user wants to access exists, according to an embodiment of the present invention.

FIG. 4 is a flow diagram showing the flow of messages between a terminal and an access point when an operator AP that the user wants to access exists, according to an embodiment of the present invention.

As shown in FIG. 4, the terminal 400 is capable of including a WLAN access management 410 and a WLAN communication interface 420. It is assumed that the terminal 400 has a communication range where an operator AP 430 that a user wants to access, another operator AP 440, and a private AP 450 exist.

Figure 2:
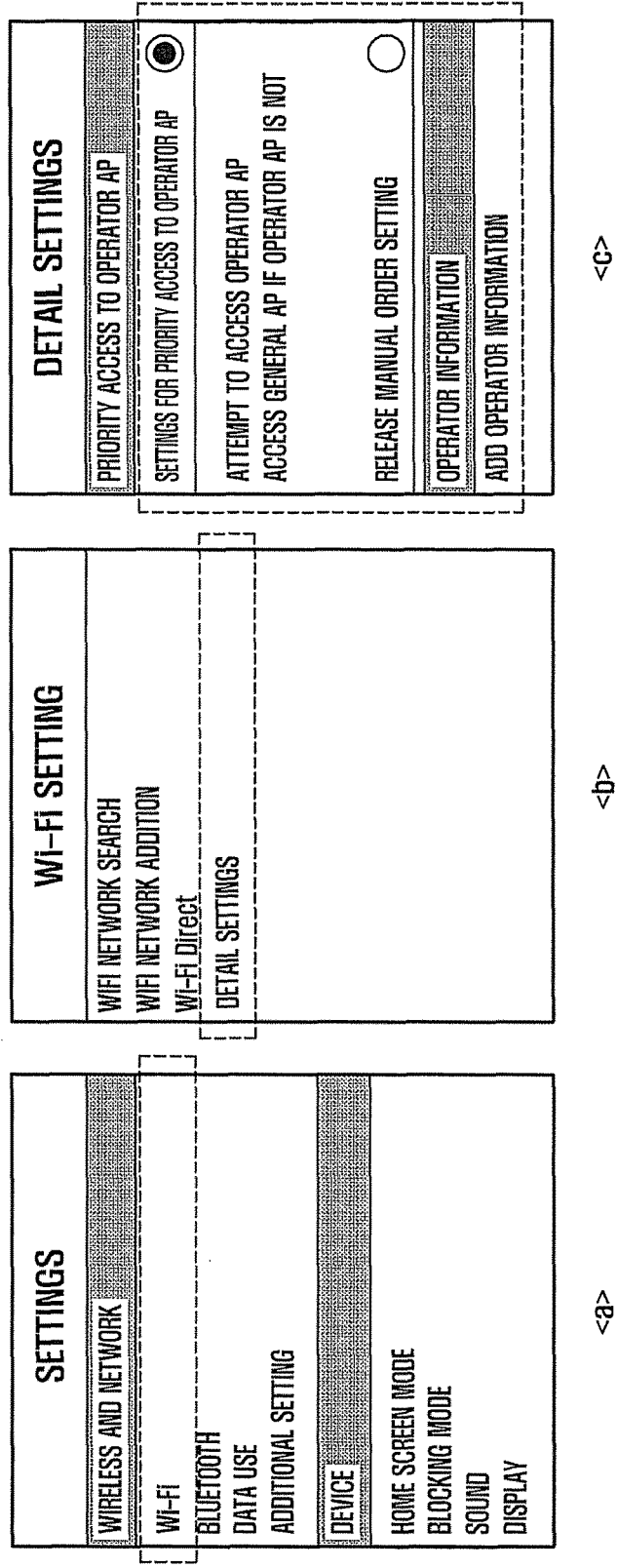
FIGS. 2a to 2c show diagrams user interfaces (UIs) for setting an AP search policy in a terminal according to an embodiment of the present invention.

The WLAN access management 410 is capable of obtaining an AP access setting policy to preferentially access an AP provided by an operator, from the user, via the user interface, in operation S410. For example, the AP access setting policy to preferentially access an AP provided by an operator may be set via the environment settings UI, etc., as shown in FIG. 2.

The WLAN access management 410 is capable of instructing to start to scan the WLAN using the MLME-SCAN.request primitive provided by the WLAN communication interface 420 in operation S420. In this case, the WLAN access management 410 may include an operator identifier to be searched, as a parameter, in the MLME-SCAN.request primitive. The operator identifier to be searched may be an identifier of a network operator that the terminal 400 is subscribed to or an identifier of a network operator designated by the user.

The WLAN communication interface 420 of which the MLME-SCAN.request primitive is called may set a timer, Max_Probe_Response_Time, for a time when the WLAN scan is ended.

The WLAN communication interface 420 is capable of broadcasting, after performing the WLAN channel competition, a probe request frame containing an operator identifier to be searched, via a WLAN channel, in operation S430.

After receiving the probe request frame, the individual APs are capable of determining whether they are related to the operator identifier contained in the probe request frame.

The operator AP 430 that the user wants to access ascertains that it is related to the operator identifier contained in the probe request frame broadcast from the terminal 400 and prepares for the transmission of a probe response frame in operation S440. After that, the operator AP 430 transmits the probe response frame to the terminal 400 in operation S 460. According to an embodiment of the present invention, the probe response frame may include the operator identifier. In addition, according to an embodiment of the present invention, the probe response frame may be a unicast message. That is, the probe response frame may be not a broadcast message, broadcast to all terminals, but a unicast message transmitted to only the terminal that transmitted the probe request frame.

On the other hand, another operator AP 440 or a private AP 450, which are not APs that the user wants to access, ascertains that it is not related to the operator identifier contained in the probe request frame broadcast from the terminal 400, and dismisses the request for the transmission of a probe response frame in operation S450.

Meanwhile, the WLAN communication interface 420 of the terminal 400 receives the probe response frame from the operator AP 430, and then informs the WLAN access management 410 that the WLAN scanning has been successful via the MLME-SCAN.confirm primitive in operation S470.

Thereafter, the WLAN access management 410 checks the capability of the operator AP 430, etc., contained in the probe response frame, determines whether it attempts to access the operator AP, and performs the access procedure, in operation S480.

Figure 5:
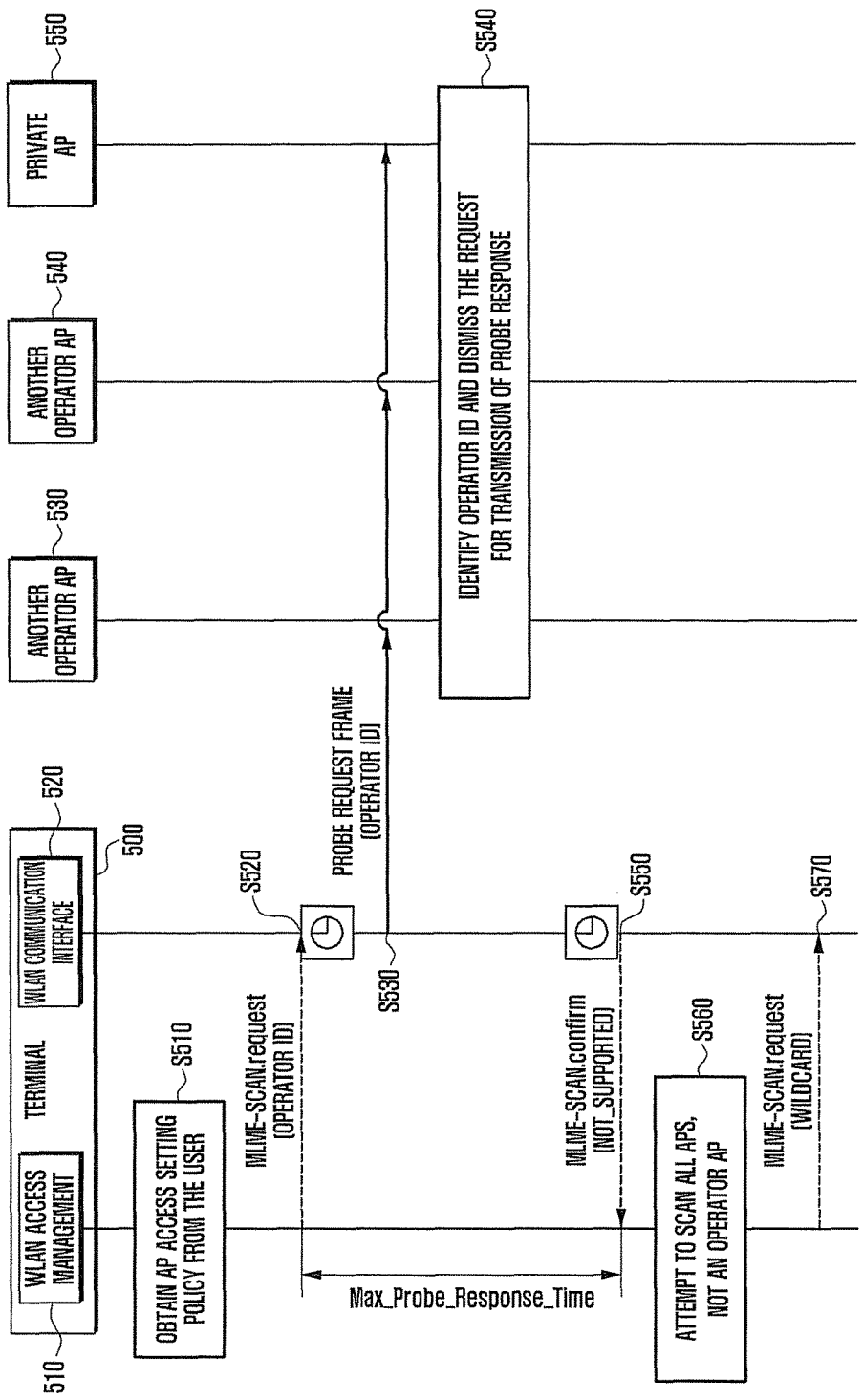
FIG. 5 is a flow diagram showing the flow of messages between a terminal and an access point when an operator AP that the user wants to access does not exist, according to an embodiment of the present invention.

FIG. 5 is a flow diagram showing the flow of messages between a terminal and an access point when an operator AP that the user wants to access does not exist, according to an embodiment of the present invention.

The terminal 500 is capable of including a WLAN access management 510 and a WLAN communication interface 520. It is assumed that the terminal 500 has a communication range where an operator AP that a user wants to access does not exist, but another two operator APs 530 and 540 and a private AP 550 exist.

The WLAN access management 510 is capable of obtaining an AP access setting policy to preferentially access an AP provided by an operator, from the user, via the user interface, in operation S510. For example, the AP access setting policy to preferentially access an AP provided by an operator may be set via the environment settings UI, etc., as shown in FIG. 2.

The WLAN access management 510 is capable of instructing to start to scan the WLAN using the MLME-SCAN.request primitive provided by the WLAN communication interface 520 in operation S520. In this case, the WLAN access management 510 may include an operator identifier to be searched, as a parameter, in the MLME-SCAN.request primitive. The operator identifier to be searched may be an identifier of a network operator that the terminal 500 is subscribed to or an identifier of a network operator designated by the user.

The WLAN communication interface 520 of which the MLME-SCAN.request primitive is called may set a timer, Max_Probe_Response_Time, for a time when the WLAN scanning is ended.

The WLAN communication interface 520 is capable of broadcasting, after performing the WLAN channel competition, a probe request frame containing an operator identifier to be searched, via a WLAN channel, in operation S530.

After receiving the probe request frame, the individual APs are capable of determining whether they are related to the operator identifier contained in the probe request frame.

In the embodiment shown in FIG. 5, the APs 530, 540 and 550 ascertains that they are not related to the operator identifier contained in the probe request frame. Therefore, the APs 530, 540 and 550 dismiss the probe request frame in operation S540. As described above, dismissing the probe request frame is used in the sense of ignoring the probe request frame or rejecting the transmission of the probe response frame in response to the probe request frame.

Meanwhile, the WLAN communication interface 520 of the terminal 500 transmits the probe request frame, and then runs the timer, Max_Probe_Response_Time. The WLAN communication interface 520 waits for the reception of a probe response frame in response to the probe request frame until the timer expires.

When the WLAN communication interface 520 has not received a probe response frame in response to the probe request frame before the timer expires, it may report, to the WLAN access management 510, a failure of WLAN scanning, as a NOT_SUPPORT state of the MLME-SCAN.confirm primitive, in operation S550.

After that, the WLAN access management 510 may determine to attempt to scan all APs, regardless of a condition as to whether an AP is an operator AP in operation S560. The WLAN access management 510 may call the MLME-SCAN.request primitive by using a WILDCARD parameter referring to the scanning of all APs, and may attempt to scan all APs, regardless of a condition as to whether an AP is an operator AP, in operation S570.

Figure 6:
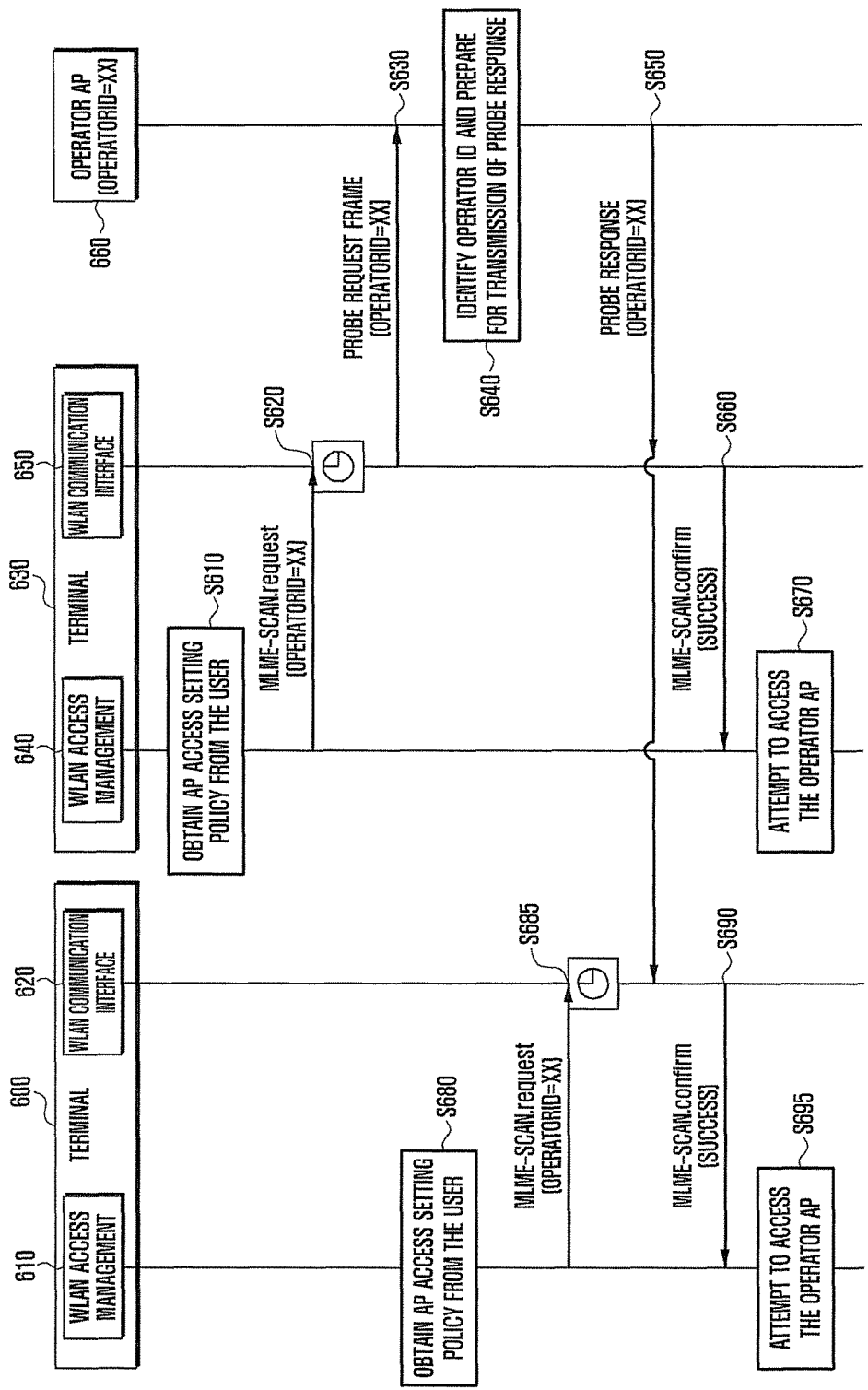
FIG. 6 is a flow diagram showing the flow of messages between a terminal and an access point when the terminal overhears a probe response frame of an operator AP that the terminal wants to access, according to an embodiment of the present invention.

FIG. 6 is a flow diagram showing the flow of messages between a terminal and an access point when the terminal overhears a probe response frame of an operator AP that the terminal wants to access, according to an embodiment of the present invention.

In the embodiment, it is assumed that: two terminals, first and second terminals 600 and 630, are located very close to each other; and an AP provided by an operator exists in a communication range of the two terminals.

The WLAN access management 640 of the second terminal 630 is capable of obtaining an AP access setting policy to preferentially access an AP provided by an operator, from the user, via the user interface, in operation S610. For example, the AP access setting policy to preferentially access an AP provided by an operator may be set via the environment settings UI, etc., as shown in FIG. 2.

The WLAN access management 640 is capable of instructing to start to scan the WLAN using the MLME-SCAN.request primitive provided by the WLAN communication interface 650 in operation S620. In this case, the WLAN access management 640 may include an operator identifier to be searched, as a parameter, in the MLME-SCAN.request primitive.

The WLAN communication interface 650 of which the MLME-SCAN.request primitive is called may set a timer, Max_Probe_Response_Time, for a time when the WLAN scanning is ended, which is not shown in FIG. 2.

The WLAN communication interface 650 is capable of broadcasting, after performing the WLAN channel competition, a probe request frame containing an operator identifier to be searched, via a WLAN channel, in operation S630.

After receiving the probe request frame, an AP, or an operator AP 660, is capable of determining whether it is related to the operator identifier contained in the probe request frame.

The operator AP 660 ascertains that it is related to the operator identifier contained in the probe request frame transmitted from the second terminal 630 and prepares for the transmission of a probe response frame in operation S640. The operator AP 660 transmits the probe response frame to the second terminal 630 in operation S650. According to an embodiment of the present invention, the probe response frame may include the operator identifier.

After receiving the probe response frame from the operator AP 660, the WLAN communication interface 650 of the second terminal 630 informs the WLAN access management 640 that the WLAN scanning has been successful vita the MLME-SCAN.confirm primitive in operation S660.

After that, the WLAN access management 640 of the second terminal 630 attempts to access the operator AP 660 in operation S670.

Meanwhile, the first terminal 600, close to the second terminal 630 that transmitted the probe request frame, may also obtain an AP access setting policy to preferentially access an AP provided by an operator, from the user, via the user interface, in operation S680.

Like the second terminal 630, the first terminal 600 calls a MLME-SCAN.request primitive containing an operator identifier identical to that of the second terminal 630 and performs a channel competition to transmit a probe request frame in operation S685. During the process, the first terminal 600 may overhear the probe response frame which is being transmitted to the adjacent terminal, e.g., the second terminal 630, in operation S650. Since the probe response frame is not encrypted, the content can be checked by any terminal that is not a destination of the probe response frame. In this case, the terminal that has checked the content of the probe response frame can identify the operator identifier, etc., of an AP that transmitted the probe response frame. Therefore, the first terminal 600 compares an operator identifier, contained in its probe request frame, with that contained in the received probe response frame.

More specifically, the first terminal 600 is capable of determining whether its received probe response frame is a probe response frame from an operator AP 660 that the first terminal 600 wants to scan, via the operator identifier contained in the received frame.

In this case, the first terminal 600 may consider the received probe response frame toward the second terminal 630 to be a probe response frame that the first terminal 600 wants to receive, instead of broadcasting a probe request frame.

The WLAN communication interface 620 of the first terminal 600 informs the WLAN access management 610 that the WLAN scanning has been successful vita the MLME-SCAN.confirm primitive in operation S690.

The WLAN access management 610 of the first terminal 600 attempts to access the operator AP 660 in operation S695.

Figure 7:
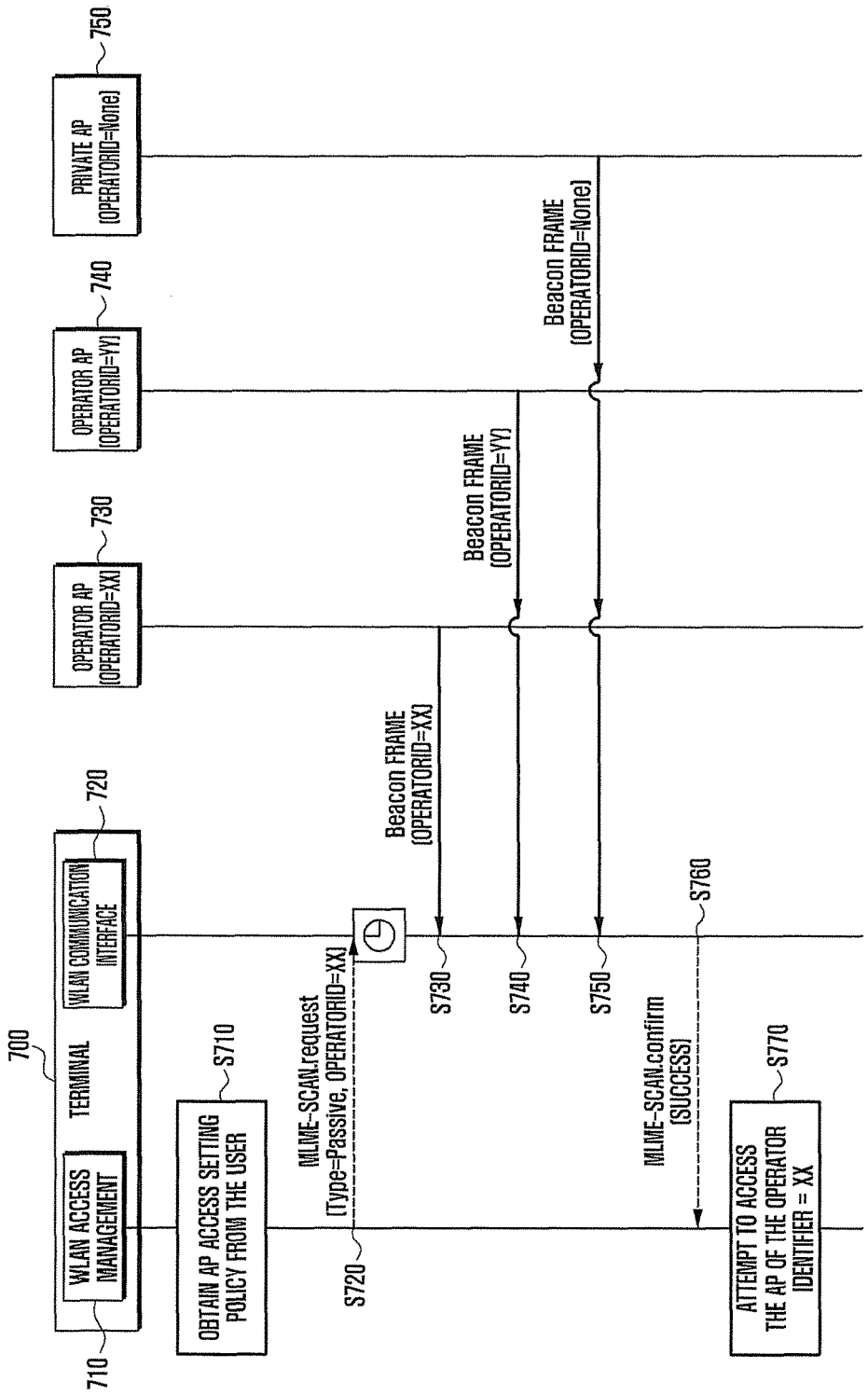
FIG. 7 is a flow diagram showing a method for a terminal to filter for a specific operator AP with performing a passive scan, according to an embodiment of the present invention.

FIG. 7 is a flow diagram showing a method for a terminal to filter for a specific operator AP with performing a passive scan, according to an embodiment of the present invention.

As shown in FIG. 7, the terminal 700 is capable of including a WLAN access management 710 and a WLAN communication interface 720. It is assumed that the terminal 700 has a communication range where an operator AP 730 that a user wants to access exists and another operator APs 740 and 750 also exist.

The WLAN access management 710 of the terminal 700 is capable of instructing to start to scan the WLAN using the MLME-SCAN.request primitive provided by the WLAN communication interface 720 in operation S720. In this case, the WLAN access management 710 may be set in such a way that a passive scan (Type=Passive) is performed, filtering a beacon frame of a specific operator (operator ID=XX).

Since the current scan mode is set to a passive scan mode, the terminal 700 receives beacon frames that are periodically transmitted (broadcast) from the individual operator APs. For example, the WLAN communication interface 720 of the terminal 700 receives: a beacon frame from an AP 730 of which the operator identifier is set to 'XX' in operation S730; a beacon frame from an AP 740 of which the operator identifier is set to 'YY' in operation S740; and a beacon frame from an AP 750 of which the operator identifier is set to 'None' in operation S750. Although the embodiment is described in such a way that the WLAN communication interface 720 receives beacon frames in order of reference numbers described above, it should be understood that the WLAN communication interface 720 may also receive them in another order.

After receiving the beacon frames from the individual operator APs 730, 740 and 750, the terminal 700 is capable of filtering whether the operator identifiers contained in the received beacon frames correspond to or are identical to an operator identifier set by the user in operation S760.

When the terminal 700 ascertains that the operator identifiers contained in the received beacon frames are identical to an operator identifier set by the user in operation S760, the WLAN communication interface 720 may inform the WLAN access management 710 that the WLAN scan has been successful via the MLME-SCAN.confirm primitive in operation S760.

The WLAN access management 710 attempts to access the AP 730 corresponding to the operator identifier='XX' in operation S770.

FIG. 8 is a diagram showing an example of a format of operator identifier contained in a probe request frame, according to an embodiment of the present invention.

As shown in FIG. 8, the format of operator identifier contained in the messages described above may include at least one of the following: a 3GPP Cellular Network element (e.g., PLMN) element, a Network Access identifier (NAI) Realm element, and a Roaming Consortium element.

FIG. 9 is a diagram showing an example of a format of operator identifier contained in a beacon frame or a probe response frame, according to an embodiment of the present invention.

As shown in FIG. 9, the format of operator identifier contained in the messages described above may include at least one of the following: a 3GPP Cellular Network element (e.g., PLMN) element, a Network Access identifier (NAI) Realm element, and a Roaming Consortium element.

As described above, the present invention enables only part, which satisfies a condition, from among the access points to be retrieved to respond to a scan request message from a terminal, thereby reducing the amount of traffic for searching for an access point that occurs in WLAN channels.

The embodiments of the present invention described in the description and drawings are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

The invention claimed is:

1. A method by a terminal to scan an access point (AP) in a wireless communication system comprising:
    setting, by the terminal via a user interface in the terminal, a policy set for priority access to an AP related to an operator;
    transmitting a probe request frame containing an identifier related to the operator for searching for the AP related to the operator, the identifier being determined based on the policy set for the priority access;
    receiving, from the AP related to the identifier, a probe response frame containing the identifier related to the operator; and
    attempting to access the AP that transmitted the probe response frame.

2. The method of claim 1, wherein the probe request frame further comprises at least one of the following:
    an identifier related to a location, and an identifier indicating a public AP.

3. The method of claim 1, wherein transmitting a probe request frame comprises:
    broadcasting the probe request frame.

4. The method of claim 1, wherein receiving a probe response frame comprises:
    receiving the probe response frame via a unicast message.

5. The method of claim 1, further comprising:
    running a timer; and
    when a probe response frame in response to the probe request frame has not been received before the time expires, transmitting a probe request frame for scanning all APs.

6. A method by an access point (AP) to respond to the AP scan in a wireless communication system comprising:
    receiving, from a terminal, a probe request frame containing an identifier related to an operator for searching for an AP related to the operator, the identifier being determined based on a policy set for priority access;
    identifying an identifier related to the operator contained in the probe request frame;
    determining whether the identified identifier corresponds to an identifier related to the AP; and
    when the identified identifier corresponds to the identifier related to the AP, transmitting, to the terminal, a probe response frame containing the identifier related to the AP in response to the probe request frame,
    wherein the policy set for priority access to the AP related to the operator is set by the terminal via a user interface in the terminal.

7. The method of claim 6, further comprising:
    when the identified identifier does not correspond to the identifier related to the AP, dismissing the transmission of a probe response frame in response to the probe request frame.

8. The method of claim 6, wherein the probe request frame further comprises at least one of the following:
    an identifier related to a location, and an identifier indicating a public AP.

9. A terminal configured to scan access points (APs) in a wireless communication system comprising:
    a wireless local area network (WLAN) communication interface for transmitting and receiving a signal; and
    a WLAN access management for setting, via an interface in the terminal, a policy set for priority access to an AP related to an operator, transmitting a probe request frame containing an identifier related to the operator for searching for the AP related to the operator, the identifier being determined based on the policy set for the priority access, receiving, from the AP related to the identifier, a probe response frame containing the identifier related to the operator, and performing a control operation to attempt to access the AP that transmitted the probe response frame.

10. The terminal of claim 9, wherein the probe request frame further comprises at least one of the following:
    an identifier related to a location, and an identifier indicating a public AP.

11. The terminal of claim 9, wherein the WLAN access management performs a control operation to broadcast the probe request frame.

12. The terminal of claim 9, wherein the probe response frame is received via a unicast message.

13. The terminal of claim 9, wherein the WLAN access management instructs the WLAN communication interface to scan the AP related to the operator.

14. The terminal of claim 9, wherein the WLAN access management runs a timer after transmitting the probe request frame, and transmits a probe request frame for scanning all APs when a probe response frame in response to the probe request frame has not been received before the time expires.

15. The terminal of claim 9, wherein the WLAN access management: determines whether a probe response frame is received from an AP related to the identifier, before transmitting the probe request frame; and performs, when a probe response frame is received from an AP related to the identifier, a control operation to attempt to access the AP that transmitted the probe response frame.

16. An access point (AP) configured to respond to the AP scan in a wireless communication system comprising:
    a wireless local area network (WLAN) communication interface for receiving and a transmitting a signal; and
    a controller for receiving, from a terminal, a probe request frame containing an identifier related to an operator for searching for an AP related to the operator, the identifier being determined based on a policy set for priority access, identifying, when receiving the probe request frame from the terminal, an identifier related to the operator AP contained in the probe request frame, determining whether the identified identifier corresponds to an identifier related to the AP, and transmitting, when the identified identifier corresponds to the identifier related to the AP, a probe response frame containing the identifier related to the AP in response to the probe request frame to the terminal, wherein the policy set for priority access to the AP related to the operator is set by the terminal via an interface in the terminal.

17. The AP of claim 16, wherein, when the identified identifier does not correspond to the identifier related to the AP, the controller dismisses the transmission of a probe response frame in response to the probe request frame.

18. The AP of claim 16, wherein the probe request frame comprises at least one of the following:

an identifier related to a location, and an identifier indicating a public AP.

* * * * *